United States Patent
Barber

[15] 3,660,816
[45] May 2, 1972

[54] TIRE CONDITION INDICATING SYSTEM

[72] Inventor: Forrest E. Barber, 9255 4th Avenue, Jacksonville, Fla. 32208

[22] Filed: Feb. 4, 1970

[21] Appl. No.: 8,543

[52] U.S. Cl. ........................... 340/58, 307/10 R, 339/3 R
[51] Int. Cl. ........................................................ B60c 23/04
[58] Field of Search ............... 340/58; 200/61.25; 307/10 R; 339/3 R, 1, 10

[56] References Cited

UNITED STATES PATENTS

| | | | |
|---|---|---|---|
| 1,652,733 | 12/1927 | Rouch et al. | 340/58 |
| 2,362,883 | 11/1944 | Cecil | 339/3 R |
| 1,019,557 | 3/1912 | Terpining | 200/61.25 |
| 2,822,530 | 2/1959 | Roten | 340/58 |

Primary Examiner—John W. Caldwell
Assistant Examiner—Glen R. Swann, III
Attorney—George H. Baldwin and Arthur G. Yeager

[57] ABSTRACT

A low pressure indicating system for a vehicle including an electrical circuit having an indicator mounted on the frame and a switch pneumatically connected to the tire and responsive to a predetermined low pressure condition thereof. The switch is located within the tire rim cavity and rotatively connected to the tire assembly. A rotating brush is electrically connected to the switch and cooperates with a non-rotating shaft extending coaxial with the axle. An elongated electrical cable extends from the shaft outboard of the tire to the frame, such cable being rigid and extensible to permit upward and downward movement of the tire assembly with respect to the frame while inhibiting rotation of the shaft.

14 Claims, 6 Drawing Figures

PATENTED MAY 2 1972

INVENTOR
Forrest E. Barber

BY
George H. Baldwin
ATTORNEY

INVENTOR
Forrest E. Barber

BY
George H. Baldwin
ATTORNEY 3,660,816

TIRE CONDITION INDICATING SYSTEM

BACKGROUND OF THE INVENTION

1. Field of the Invention

This invention relates to tire condition indicating systems and more particularly to low pressure indicating systems for vehicles having pneumatic tires.

2. Description of the Prior Art

There have been many attempts in the prior art of providing alarm or indicator systems for detecting low pressures in pneumatic tires. Among the prior art the following patents were found in the novelty search: U.S. Pat. Nos. 2,560,852; 2,794,875; 2,794,876; 2,946,866; 2,966,563; 3,155,938; 3,157,851; 3,158,706; 3,162,835; 3,241,112; 3,117,195; and 3,389,374. While there are various problems with the systems disclosed in the above patents, the most important problem appears to be the necessity of special and complicated installation requirements among which are the drilling of openings through the axle and/or brake drum of the wheel assembly, such problem being eliminated in accord with this invention as hereinafter more fully described.

SUMMARY OF THE INVENTION

This invention relates to a remote tire condition indicating system for a wheeled vehicle including an indicator means mounted on said frame means and switch means in electrical circuit with the indicator means and located remotely therefrom in the tire cavity and connected to the tire assembly for rotation therewith, the switch means being responsive to a condition of the tire. An electrically conducting elongated element extends outwardly of the frame means and tire and has one end in electrical communication with the indicator means. A pair of relatively rotatable means complete the circuit between the switch means and the other end of the element, one means being connected to the other end of the element and non-rotatable with the assembly, and the other means being rotatable with the assembly and electrically connected to the switch means whereby the electrical circuit between the switch means and indicator means is completed for indicating the condition of the tire.

Other aspects of the invention are seen in the one non-rotatable means including a shaft with the elongated element extending from the shaft to the frame means. The element is rigid and extensible to permit upward and downward movement of the tire assembly with respect to the frame means while inhibiting rotation of the shaft. Spring means are associated with the element to maintain same tensioned during upward and downward movement of the tire assembly with respect to the frame means. A housing including a bearing means is located coaxially with the axis of rotation of the tire assembly and journals the shaft coaxially with such axis. The other rotatable means includes an electrical brush cooperating with the shaft and providing an electrical connection between the switch means and shaft.

A general object of this invention is to provide an improved tire condition indicating system.

A particular object is the provision of such a system in which the electrical connection between the wheel assembly and the vehicle frame is outboard of the wheel assembly.

A further particular object is to provide such a system which is manufactured from inexpensive components and readily installed with minimum modification of the vehicle.

A specific object is the provision of such a system with the tire condition responsive means within the tire rim cavity and the electrical connection to the frame outwardly of the tire rim cavity, such connection being rigid yet extensible to permit up and down movement of the wheel assembly with respect to the frame.

Other specific objects are to provide such a system which is simple and inexpensive in the manufacture and installation on vehicles; sturdy and durable in the construction, service and use; and efficient and reliable in operation and use.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DESCRIPTION OF THE PREFERRED EMBODIMENT

Figure 1:
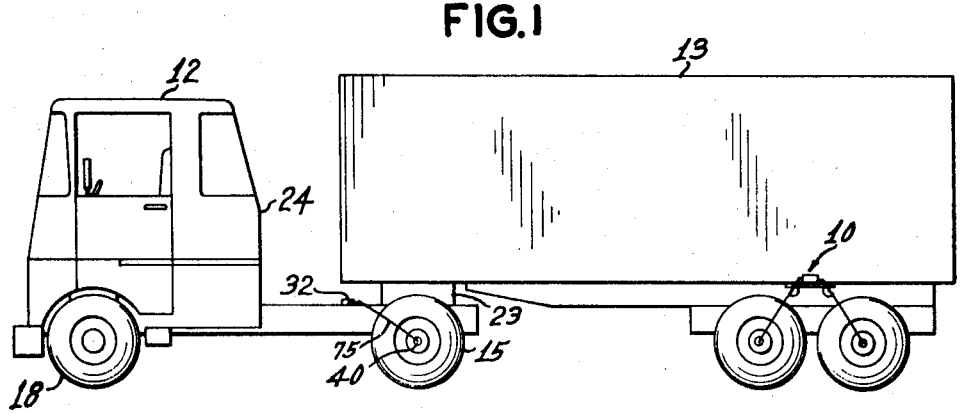
FIG. 1 is a side elevational view of a tractor and trailer vehicle on which the tire condition indicating system of the present invention has been incorporated.
Figure 2:
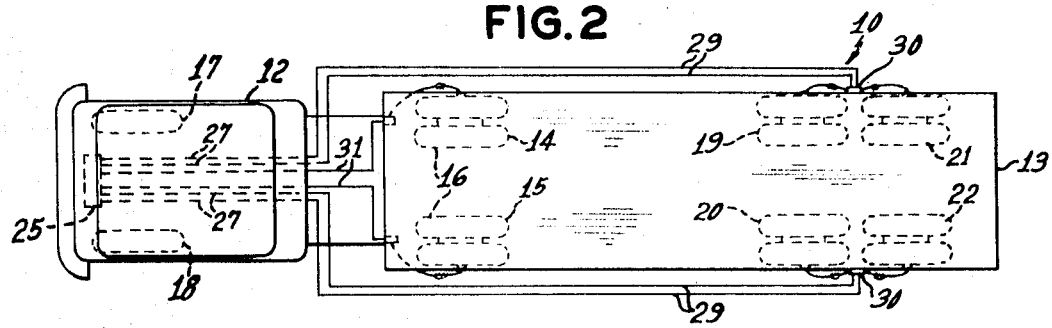
FIG. 2 is a top plan view of the vehicle shown in FIG. 1.
Figure 5:
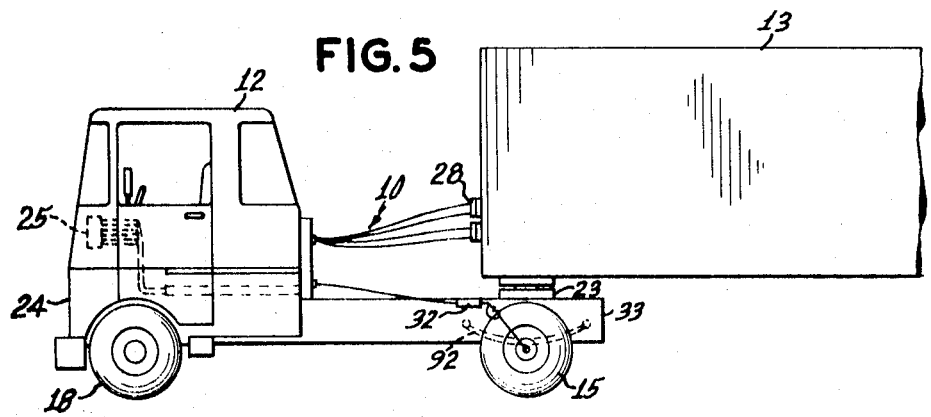
FIG. 5 is a side elevational view similar to FIG. 1 showing the electrical connections between the tractor and trailer and the electrical connection between the rear tractor tire and the cab of the tractor.

Referring now more particularly to the drawings, namely, FIGS. 1, 2 and 5, a tire condition indicating system, generally depicted at 10, is shown schematically disposed on a tractor 12 and a trailer 13, tractor 12 being supported by two rear wheel assemblies 14 and 15 of dual pneumatic tires, collectively designated at 16, and front wheel assemblies 17 and 18 with trailer 13 being supported by four wheel assemblies 19, 20, 21 and 22 of dual pneumatic tires. The tractor 12 and trailer 13 may be coupled, for example by any well known fifth wheel assembly 23 in a conventional manner.

Figure 6:
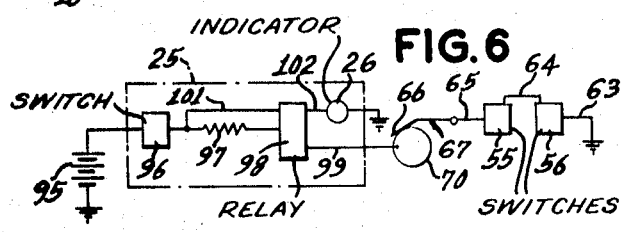
FIG. 6 is a schematic representation of the electrical circuit between one set of dual tires and the console located within the cab of the tractor.

The tire condition indicating system 10 includes a console 25 mounted within the cab 24 in which an alarm or indicator, for example, light 26 being shown in FIG. 6, is mounted, such indicator becoming activated or deactivated to indicate a condition in one of the tires on either the tractor 12 or trailer 13. A plurality of wires 27 are connected to the console 25 in the cab 24 of the tractor and extend through gladhands 28 for connection through wires 29 to the connector boxes 30 spaced above and between the rear sets of dual pneumatic tires 20, 22 and 19, 21, connector boxes 30 being mounted on the trailer frame in a conventional manner. The wires 31 leading from the console 25 to each of the connector boxes, including connector box 32 which is mounted on the frame 33 of tractor 12, provide for the electrical connection between the console 25 and the actuating means in the assembly 40 which is connected to the rear wheel assemblies 14 and 15, hereinafter more fully described in connection with FIGS. 3, 4 and 6.

Figure 4:
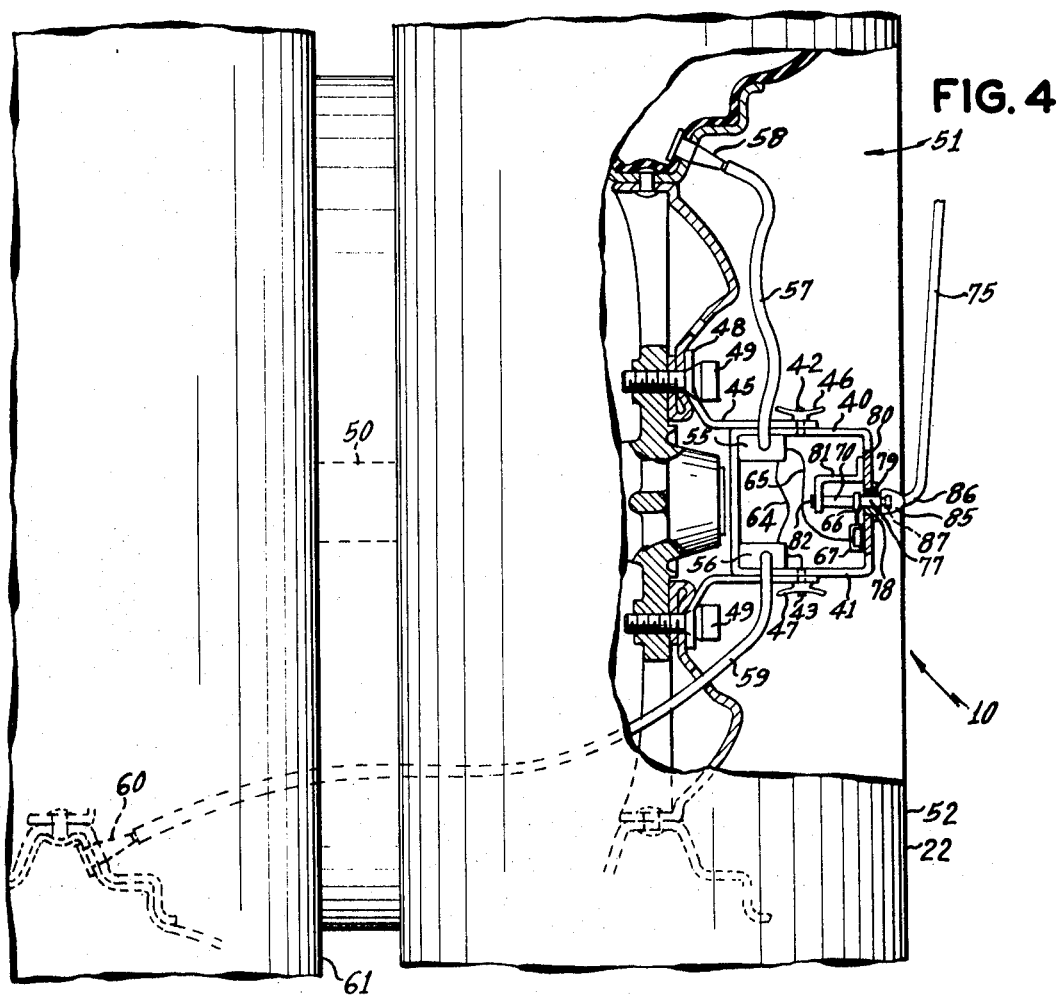
FIG. 4 is a front elevational view of one set of dual tires shown in FIG. 3, partly in section and on an enlarged scale and depicting details of the present invention.

The actuating assembly 40 is more clearly shown in FIG. 4 and is seen to comprise an enclosed housing 41, preferably of plastic or similar insulative material, having outwardly extending metal bolts 42 and 43 extending through respective openings in adapter 45, metal wing nuts 46 and 47 being threaded on respective bolts 42 and 43 for removably attaching housing 41 to adapter 45. Adapter 45 includes a plurality of flanges 48 for attachment to the wheel assembly 22 by lugs 49, it being understood that other adapters with a different number of flanges may be needed to mount housing 41 to other wheel assemblies. It is also to be understood that the openings in the adapter through which bolts 42 and 43 extend may be elongated in the direction of the axle, shown by broken lines 50, to permit lateral movement of the housing 41 to position same within the cavity 51 or the outline of the outer tire 52, thereby protecting same from external objects which may be encountered in movement of the tractor and trailer.

Switch means responsive to a condition of the tire are mounted within housing 41, such switch means being in the form of a pair of pressure responsive switches 55 and 56 with switch 55 being pneumatically connected by hose 57 to tire valve tube 58 and switch 56 being connected by hose 59 to tire value tube 60 of the inner tire 61 of the dual set of tires 22. Switches 55 and 56 are well-known in the art and may be of the type that are normally closed during inflation above a predetermined set pressure. In the embodiment of the invention shown and described herein, the switches are normally closed when sufficient air pressure is present in the tires. These switches may be obtained upon order for opening or closing upon a specific pneumatic pressure or other types of switches may be obtained in which the switch is actuated at a settable pressure which may be changed by varying the compression on a spring through a threaded bolt or the like. As may be seen from FIG. 6, switch 56 is grounded by wire 63 connected to electrically conducting bolt 43 and wire 64 connects switch 56 in series with switch 55 while wire 65 connects switch 55 in series with one of a pair of relatively rotatable means, in the form of an electrical brush 66, and through electrically conducting brushholder 67. As may be seen from FIG. 4, the housing 41 including switches 55 and 56 and brushholder 67 and brush 66 rotate with the wheel assembly 22, whereas the other of the pair of relatively rotatable means, in the form of shaft 70, in electrical contact with brush 66, is maintained stationery with respect to housing 41 to which is mounted a cable element 75 which is attached at its upper end 76 to connector box 30 and via lines 29, glad hands 28, and lines 27, to the indicator 26 in console 25. Shaft 70 includes an end portion 77 suitably journalled in a water and debris sealing manner, as indicated by bearing means 78, bearing means 78 being mounted in an opening 79 in end 80 of housing 40. A Z-shaped bracket 81 is connected to end wall 80 within housing 40 and rotatively supports shaft end 82 within a bearing means (not shown). Each of the bearing means, including bearing means 78 may, for example, be of an insulative material such as nylon or the like. If the housing 40 were electrically conductive, either the bearing means would need to be insulative or some insulative bushing be provided to insulate shaft 70 from ground and/or from shorting out through housing 40.

In order for shaft 70 to be non-rotatable, shaft 70 and bearing means 78 are preferably coaxial with the axis of rotation of the wheel assembly 22, namely the longitudinal axis of axle 50. Furthermore, the cable element 75 is rigid yet extensible to further maintain shaft 70 non-rotatable with respect to the rotating brush 66 and wheel assembly 22.

Figure 3:
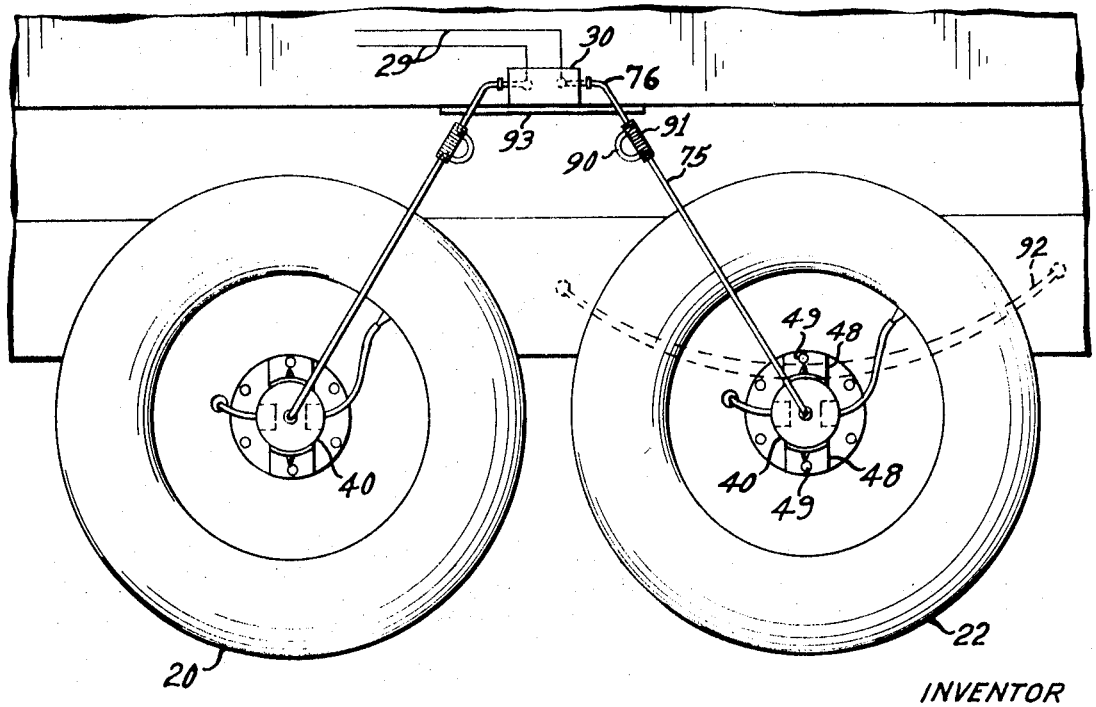
FIG. 3 is an enlarged side elevational view of the rear set of dual tires on the tractor and more clearly depicting the indicating system of the invention.

Cable element 75 is preferably an armored cable or the like having a quick fit connection 85 at its lower end 86 for ready attachment to the outwardly extending T-shaped end 87 of shaft 70. Element 75 is generally extensible to permit the wheels to rise and fall with respect to the frame in a conventional manner, as illustrated by leaf spring 92 attached between the frame and axle housing (not shown). Element 75 is specifically shown as including a loop portion 90 and tension spring 91 suitably connected on either end of loop portion 90 to maintain the armored cable element 75 tensioned while permitting up and down movement of the wheel assembly 22 during normal motoring of the tractor and trailer. A bar 93 is attached to the trailer frame and extends outwardly therefrom sufficiently for the cable 75 to be substantially straight and taut between connection 85 and bar 93 as illustrated in FIGS. 3 and 4.

It is thus seen that the tire condition indicating system in accord with this invention provides an electrical connection between the rotating wheel assemblies and the non-rotating frame of the trailer and/or tractor which is outboard of the wheel assemblies and requiring a minimum of time and installation, particularly as compared with the low pressure or other tire condition indicating systems which affect the electrical connection inboard through the brake drum and/or axle of the tractor and/or trailer.

A simplified electrical circuit is shown in FIG. 6 which includes the battery power source 95 of the tractor for supplying a voltage through an on-off switch 96 and dropping resistor 97 to a low voltage relay 98, relay 98 being connected through wire 99 (corresponding to lines 27 and/or 31 and lines 29, and cable 75 of one wheel assembly) to shaft 70. As has been previously described, shaft 70 is connected by brush 66 and holder 67 via line 65 to switch 55, switch 55 being series connected by line 64 to switch 56 and via line 63 to ground through bolt 43, adapter 45, etc.

When either of the switches 55 and 56 responds to a condition (low pressure is the embodiment herein shown and described) of either tire 52 or 61, for example, the circuit is opened thereby actuating relay 98 to connect the battery 95 through lines 101 and 102 to indicator 26 thereby indicating the condition of one of the tires. Relay 98 is preferably spring loaded so that once the tire is repaired, the relay will disconnect line 101 from line 102 (or battery 95 from indicator 26) and re-establish the low voltage circuit through switches 55 and 56 thereby minimizing the drain on the battery 95.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a remote tire condition indicating system for a wheeled vehicle having a frame means and a tire assembly including a tire, and a rim with a cavity therein comprising an electrical circuit including an indicator means mounted on said frame means, an enclosed housing mounted within said cavity for rotation therewith, switch means in circuit with said indicator means and being located in said housing, and said switch means being responsive to a condition of said tire, an electrically conducting elongated element extending outwardly of said frame means and tire and having one end in electrical communication with said indicator means, a pair of relatively rotatable means completing the circuit between said switch means and the other end of said element, one said means extending through said housing and being connected to the other end of said element and non-rotatable with said housing, means for sealing said one means to said housing whereby water and debris are inhibited from entering said housing, the other said means being located within said housing rotatable therewith and being electrically connected to said switch means.

2. In the remote tire condition indicating system as defined in claim 1 wherein said one rotatable means includes a shaft extending through and mounted by said sealing means coaxially with the axis of rotation of said tire assembly, said other rotatable means includes an electrical brush cooperating with said shaft and providing an electrical connection between said switch means and shaft.

3. In the remote tire condition indicating system as defined in claim 1 wherein said housing includes an opening therethrough coaxial with the axis of rotation of said tire assembly, said sealing means being located in said opening for journalling said one means therein, said one means extending through said sealing means and being in rotatable electrical contact with said other means within said housing.

4. In the remote tire condition indicating system as defined in claim 1 wherein said one means includes an elongated shaft, said other means includes an electrical brush in contact with said shaft within said housing, said shaft extending through and being rotatively supported by said sealing means in a direction coaxially with the axis of rotation of said assembly, said other end of said element being connected to said shaft outwardly of said housing.

5. In the remote tire condition indicating system as defined in claim 1 wherein said sealing means is a bearing, said one means including an elongated shaft journalled in said bearing with the axis of said shaft and bearing being coaxial with the axis of rotation of said assembly.

6. In the low pressure tire indicating system as defined in claim 1 wherein said one means includes a shaft, said element extending from said shaft outwardly of said housing to said frame means, said element being rigid and extensible to permit upward and downward movement of said tire assembly with respect to said frame means while inhibiting rotation of said shaft.

7. In the low pressure tire indicating system as defined in claim 6 further comprising spring means associated with said element to maintain same tensioned during upward and downward movement of said tire assembly with respect to said frame means.

8. In a low pressure indicating system for a wheeled vehicle having a frame means and pneumatic tire assembly including a tire having a tire rim cavity comprising an electrical circuit including a power source and an indicator means mounted on said frame means and switch means in circuit with said indicator means, said switch means being pneumatically connected to said tire and being responsive to a predetermined low pressure condition of said tire, said switch means being rotatively connected to said tire assembly and being located within said tire rim cavity, first means for electrically connecting said switch means to said indicator means, said first means including a rotating means electrically connected to said switch means and a non-rotating means extending outwardly of said tire rim cavity said non-rotating means including a shaft, bearing means for journalling said shaft coaxially with the axis of rotation of said tire assembly, said first means further including means between said rotating and non-rotating means to maintain the electrical connection therebetween during rotation of said tire assembly, said indicator means including an indicator and a relay means for normally completing the circuit between said source and said switch means, said relay means completing the circuit between said source and said indicator when said switch means responds to said predetermined low pressure condition of said tire.

9. In the low pressure tire indicating system as defined in claim 8 further comprising a housing mounted to said tire assembly within said cavity, said bearing means being supported by said housing.

10. In the low pressure tire indicating system as defined in claim 8 wherein said rotating means includes an electrical brush cooperating with said shaft and providing an electrical connection between said switch means and shaft.

11. In the low pressure tire indicating system as defined in claim 8 further comprising a housing, means for mounting said housing to and within said cavity of said tire assembly for rotation therewith, said rotating means and switch means being located within and attached to said housing, said housing having an opening therethrough coaxial with the axis of rotation of said tire assembly, said bearing means being disposed in said opening, said shaft extending through said bearing means and being in rotatable contact with said rotating means within said housing.

12. In the low pressure tire indicating system as defined in claim 8 further comprising an enclosed housing mounted to said tire assembly within said cavity and being rotatable with said tire assembly, said rotating means includes an electrical brush in contact with said shaft within said housing, said shaft extending through said housing, said non-rotating means further including an elongated electrical cable having one end connected to said shaft outwardly of said housing, said bearing means being disposed sealingly between said shaft and housing to inhibit water and debris from entering said housing.

13. In the low pressure tire indicating system as defined in claim 8 further comprising an elongated electrical cable extending from said shaft to said frame means, said cable being rigid and extensible to permit upward and downward movement of said tire assembly with respect to said frame means while inhibiting rotation of said shaft.

14. In the low pressure tire indicating system as defined in claim 13 further comprising spring means associated with said cable to maintain same tensioned during upward and downward movement of said tire assembly with respect to said frame means.

* * * * *